F. W. WIESEBROCK.
Liquid-Cooler.

No. 202,389. Patented April 16, 1878.

WITNESSES,
Rudolph F. Eilenberg
George Warst Jr.

INVENTOR,
Frederick W. Wiesebrock
by Schatz & Salmon
attys

UNITED STATES PATENT OFFICE.

FREDERICK W. WIESEBROCK, OF BROOKLYN, NEW YORK.

IMPROVEMENT IN LIQUID-COOLERS.

Specification forming part of Letters Patent No. 202,389, dated April 16, 1878; application filed January 28, 1878.

*To all whom it may concern:*

Be it known that I, FREDERICK W. WIESEBROCK, of the city of Brooklyn, county of Kings, State of New York, have invented a new and useful Improvement in Coolers, which invention is fully described in the following specification and the accompanying drawings, in which—

Figure 1:
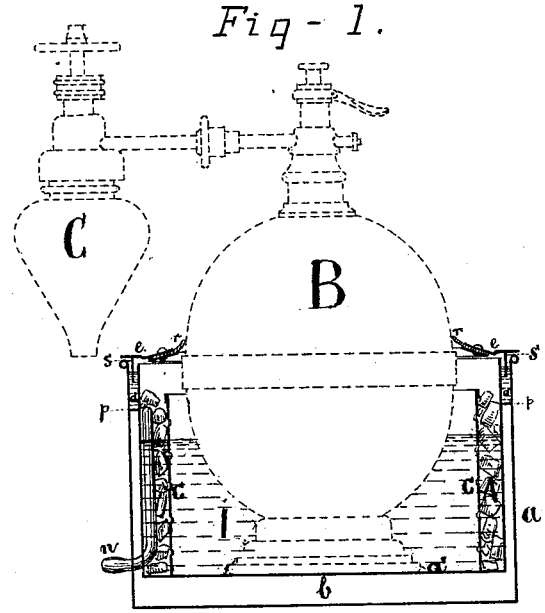
Figure 2:
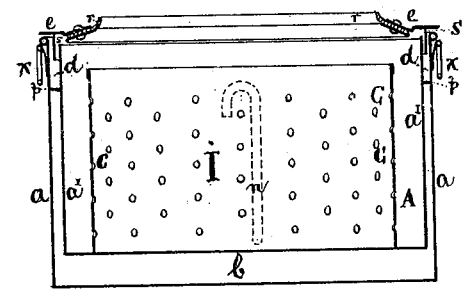
Figure 3:
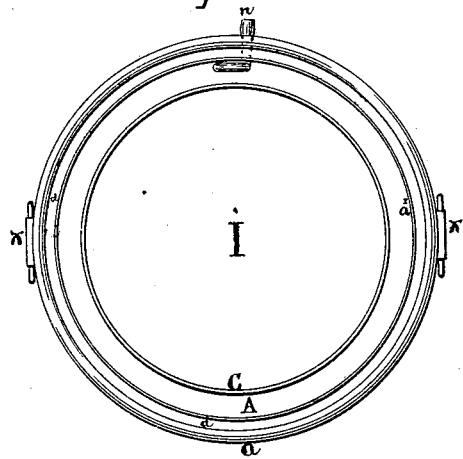
Figure 4:
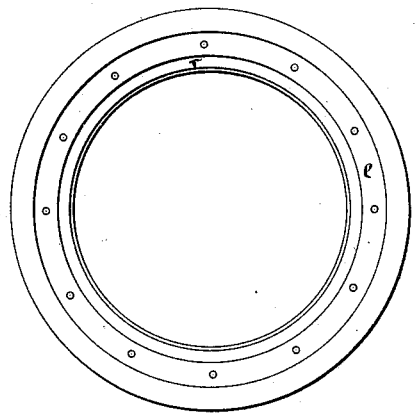

Figure 1 represents a vertical section. Fig. 2 represents a vertical section taken at right angles to Fig. 1. Fig. 3 is a plan view with the cover removed, and Fig. 4 is a plan view.

Similar letters represent corresponding parts.

The object of my invention is to provide a cover for vessels containing liquids, particularly fountains containing aerated liquids, without bringing the same in contact with the ice, and facilitating the removal of the same, by means of a covering constructed as will be shown hereinafter.

I am aware that heretofore coolers have been constructed having inner and outer shells, the space between said shells being filled with non-conducting material, and also having partitions for the purpose of keeping the ice from coming in contact with the vessel to be cooled, and having rubber rings or strips fitting tightly around the vessel, and constructed so as to allow the insertion and removal of the bottle or vessel without removing the cover, the cover fitting tightly to the cooler.

I am also aware that a water-seal is old in cooling devices.

In the coolers constructed by me the cover is so constructed that the vessel can be removed without first having to remove the cover by simply lifting the vessel out of the cooler, thereby removing the cover, the removal of the cover being facilitated by reason of the downwardly-projecting rim not fitting tightly to the sides of the cooler.

In the drawing, letter $a$ represents the outer shell, provided with handles $x\ x$; $a'$, the inner shell of cooler, united to the outer shell by means of the partition $p$, dividing the space between the shells into two compartments, $b$ and $d$, the space $b$ being filled with non-conducting material.

C is a perforated partition fastened to the inner shell, and provided for the purpose of preventing the ice from coming in contact with the vessel to be cooled, and allowing the water to flow through the perforations. $e$ is the cover, provided with the downwardly-projecting rim $s$, which fits loosely into the space $d$, and having an opening. $r$ is a rubber ring fastened to the top of the cover, and partly overlapping the opening in the top of cover. $n$ is a tube attached to the inner side of the shell $a'$, the tube being bent at the inside end, the other end passing through the shells, and is intended to carry off the overflow of water.

When in use, the space A, which is between the perforated partition and the shells, is filled with ice. The fountain B or other vessel is then set into the space I, as shown in Fig. 1. The compartment $d$ is then filled with water. The cover is then passed over the neck of the fountain or vessel.

The body of the fountain being larger than the opening in the cover, the rubber ring is pressed tightly around the body of the vessel, and the rim $s$ sets in the water in the space $d$, thus forming a water-seal, and preventing all atmospheric circulation, and the warm air from coming in contact with the ice, thereby causing a great saving of ice and lowering the temperature in the cooler.

When it becomes necessary to refill the cooler with ice or remove the vessel, it is only necessary to lift the vessel out, the cover being raised at the same time. The overflow of water is carried off by the tube $n$.

Having thus described my invention, what I claim as new, and desire to secure by Letters Patent, is—

1. In a cooler constructed substantially as described, the cover $e$, having an opening, the rubber ring $r$, overlapping the opening, and the rim $s$, fitting loosely into the water-compartment $d$, as described, and for the purpose herein set forth.

2. In a cooler constructed as described, having two shells, and provided with a water-seal, the combination of the cover $e$, provided with an opening, the rubber ring $r$, and the rim $s$, as described, and for the purpose herein set forth.

FREDERICK W. WIESEBROCK.

Witnesses:
JACOB H. ALBECK,
RUDOLPH F. EILENBERG.